Figure 1:
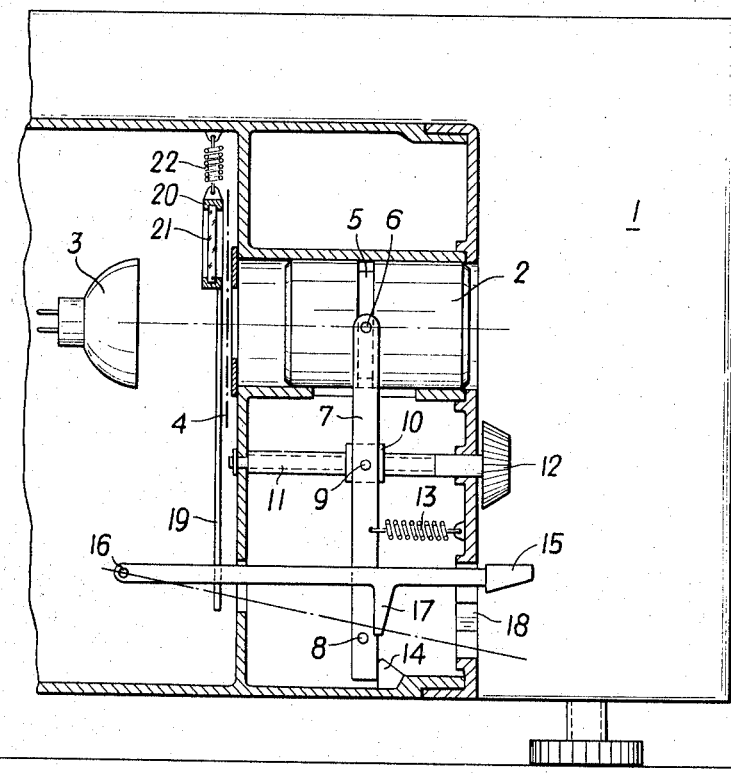

United States Patent [19]
Wessner

[11] 3,785,727
[45] Jan. 15, 1974

[54] MOTION FILM PROJECTOR

[75] Inventor: Harald Wessner, Neunkirchen, Austria

[73] Assignees: Karl Vockenhuber; Raimund Hauser, both of Vienna, Austria

[22] Filed: Oct. 5, 1972

[21] Appl. No.: 295,296

[30] Foreign Application Priority Data
Oct. 12, 1971 Austria.............................. A8824/71

[52] U.S. Cl. ................................. 352/137, 352/140
[51] Int. Cl. ............................................... G03b 3/00
[58] Field of Search..................... 352/137, 139, 140

[56] References Cited
UNITED STATES PATENTS
3,484,159  12/1969  Roman et al. ...................... 352/140
3,520,596   7/1970  O'Donnell et al. ................... 352/92
3,447,867   6/1969  Nerwin .............................. 352/140

*Primary Examiner*—Joseph F. Peters, Jr.
*Assistant Examiner*—Alan Mathews
*Attorney*—Ernest G. Montague

[57] ABSTRACT

A motion film projector which comprises an image plane and a gate for holding a frame of a motion picture film to be projected in the image plane. An optical system defines an optical axis, and the frame is located on the optical axis. A focusing device is provided for the optical system. A drive is arranged for feeding the film along a predetermined path including the image plane. The drive has at least two operating modes comprising at least one run mode and a still mode of operation for selectively providing motion picture projection and still picture projection. A focus adjuster is connected to the focusing device to provide a basic adjustment of the same for focusing the frames of the film during the run mode oepration. A mode selector controls the operating modes of the drive and has accordingly at least one run mode position and a still mode position. A coupling member is provided to connect the focusing device to the mode selector. The mode selector further has a plurality of focusing positions adjacent the still mode position. In the focusing positions the coupling member connects the focusing device to the mode selector to override the basic adjustment and to focus the frame individually during the still mode operation.

8 Claims, 9 Drawing Figures

MOTION FILM PROJECTOR

The invention relates to a motion film projector with a projection lens and two focusing means operable independently from each other for adjusting the projection lens or an optical member thereof relatively to the position of the film, whereby one of the focusing means and a device for standstill projection are actuated by a single operating mechanism.

It is known that at standstill projection of motion picture films in projectors, the disadvantage occurs that the emulsion layer of the film dries out due to the heat given off by the projection lamp and consequently the picture lying in the film gate gets vaulted. The reproduction is then no longer sharp and an adjusting focusing of the lens becomes necessary. Due to the previous adjustment of the lens a renewed focusing is required at the following projection with running film to reestablish the original setting.

In order to avoid these disadvantages, an arrangement controlled by an electromagnet has become known, which effects a focusing of the lens at standstill. After the standstill projection the magnet is again deenergized, the anchor falls off and the setting device for the lens connected with the anchor reestablishes the original focusing. The high expenditure of structural members, respectively, the complicated mechanism of the transmission gear from the anchor to the focusing means turns out to be very disadvantageous. In addition, the amount of the adjusting focusing at standstill is constant, due to the predetermined position of the attracted anchor, independent of whether the image is really sharp or not. Another known arrangement provides a plane parallel glass plate inserted in the path of rays of projection between the film gate and the projection lens for adjusting focusing at standstill. Besides the disadvantage of the adjusting focusing by a fixed amount there results a further disadvantage, namely with respect to the thickness of the glass plate, because by this glass plate the small light intensity prevailing at standstill already by the inserted heat insulating filter between projection lamp and film gate is further reduced.

According to the invention it is suggested that the operating mechanism in an equipment of the kind mentioned above has following the position "standstill", a focus adjusting range for the continuous focusing on different image positions of the film. In that way the image may be focused according to its effective position in the film gate, whereby the light intensity is not influenced. Upon following the projection with running film, the original focusing of the lens is immediately reestablished. Moreover the structural expenditure of this arrangement is very small.

In order to reduce the heat emanated by the projection lamp in the direction of the film, it is advantageous to connect a heat insulating filter to the operating mechanism, as it is already known, whereby the heat insulating filter is switchable in the position "standstill" in the path of rays of the projection lens.

According to a further advantageous embodiment of the invention it is suggested that the operating mechanism shows a plurality of switch positions, which, arranged with respect to their amount, correspond with different image frequencies, whereby one extreme working position of the operating mechanism corresponds with the largest image frequency, whereas the other extreme position corresponds with standstill projection. At the same time the operating mechanism could in that way be connected with a device controlling the film drive with variable image frequency.

Figure 1A:
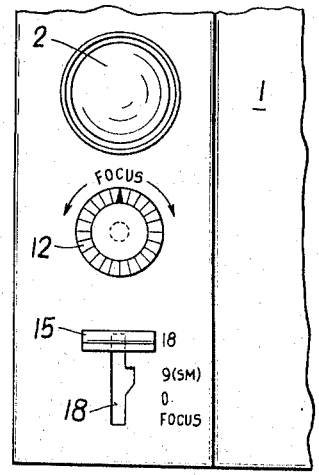
Figure 2:
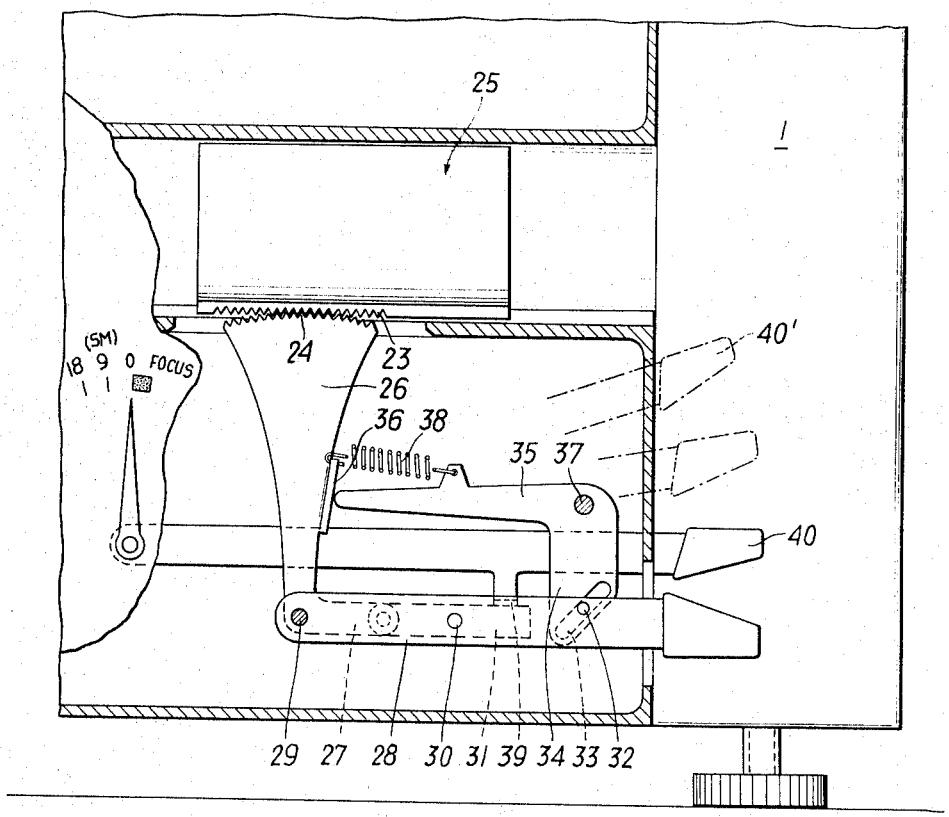

Further advantages and details of the invention will become apparent from the specification of schematically illustrated embodiments in the attached drawings. FIG. 1 shows a variation of the inventive embodiment, whereby FIG. 1A represents a partial front elevation of FIG. 1. FIG. 2 displays a further embodiment of the invention. FIGS. 3 to 6 show embodiments of arrangements for coarse and fine setting of the lens.

FIG. 1 shows schematically the contours of a projector 1, in which a lens 2 reproduces a film 4 illuminated by a light source 3 on a projection plane, not shown. The casing of the lens 2 is shiftable in a straight guide fixed to the projector and shows has a ring-shaped groove 5, in which a guide pin 6 which is fixed to a lever 7 is guided free from play. The lever 7 bears a further pin 8 on its end lying opposite the fixation of the guide pin 6. Between these two pins 6 and 8, a threaded sleeve 10 is pivotally arranged around an axis 9 of the lever 7. The threaded sleeve 10 cooperates with a threaded coupling pin 11 pivotally arranged in the projector casing, which is provided on the front surface of the casing with a setting knob 12. The bearing of the threaded coupling pin 11 in the casing 1 secures it against axial shifting. As the lever 7 is forced by a tension spring 13 fixed on the casing 1 in the direction of the projection plane, it abuts a fixed stop 14.

If at the beginning of motion picture projection the lens 2 is focused, the setting knob 12 is turned, which causes a shifting of the threaded sleeve 10, which is pivoted to the lever 7 along the threaded coupling pin 11. The stop 14 functions here as a point of rotation for the lever 7. The movement of the lever 7 is transmitted to the lens 2 by the pin 6.

In order to regain the sharpness of reproduction, which has been lost at standstill projection because of the bending of the film image standing in the film gate, an arrangement for focus adjustment of the lens is disposed under the setting knob 12. This arrangement is formed by a lever 15, which is pivotally arranged round an axis 16 and has an extension 17 in the immediate neighbourhood of the pin 8 of the lever 7. The end of the lever 15 extending through the projector casing 1 is guided in a slot 18 of the casing wall (see FIG. 1A). A rod 19 shiftable in transverse direction to the optical axis of the lens 2 bears a mount 20 for a heat insulating filter 21. This rod is 19 connected at one end with the lever 15 is charged at the opposite end by a tension spring 22, which is fixed to the casing. By this tension spring 22, the lever 15 is held at the same time at the upper end of the slot 18 (related to FIG. 1), which corresponds to the position for normal projection (for instance 18 frames per sec.).

At standstill projection the lever 15 is pressed downwardly against the action of the tension spring 22 along the slot 18 until it reaches the mark zero on the casing wall. Upon reaching this mark, nothing has yet changed in the setting of the lens. Only upon further moving down of the lever 15 (until the mark "focus") the extension 17 abuts the pin 8 of the lever 7 and upon renewed downwards movement of the focusing lever 15, it removes the lever 7 from the stop 14. The lever 7 is turned round the axis 9 of the threaded sleeve 10 fixed to the threaded coupling pin 11 and shifts the lens 2 along the pin-slot guide 5, 6 by an amount corresponding to the turning movement. At the same time the rod 19 connected with the focus setting lever 15 brings the heat insulating filter upon downwards movement — related to FIG. 1 — in the path of rays of the lens 2. Upon release of the lever 15 it is replaced to the initial position by the action of the spring 22, whereby the filter 21 is removed from the path of rays and the lever 7 again abuts the stop 14. In that way the adjustment of the lens 2 is again reestablished before standstill projection. Arrangements known per se and therefore not illustrated are connected with the lever 15, in order to change, at the same time by its actuation, the frame frequency from 18 frames per sec., in case over 9 frames per sec. to standstill projection.

In FIG. 2 a further inventive embodiment is schematically illustrated. The pin-slot guide 5, 6 of the embodiment described above is here replaced by a toothed rack-toothed segment guide 23, 24. At focusing in normal operation a lens 25 bearing the toothed rack 23 is deviated by the toothed segment 24 in the direction of the optical axis. A portion 26 bearing the toothed segment 23 is provided with a rectangular lever extension 27, whereby the portion 26 itself is pivotally arranged round a fixed axis 29, which also supports a focus setting lever 28. The focus setting lever 28 bears a further axis 30 for a two-armed transmission lever 31, whereby one end of the lever 31 is flexibly connected with the extension 27. A pin 32 fixed on the focus setting lever 28 engages a slot 33 milled in an arm 34 of an angle 35. The other arm of the angle lever 35 resiliently abuts an oblique surface 36 of the portion 26 bearing the segment. As the angle 35 is likewise pivotally arranged round a fixed axis 37, the portion 26, the focus setting lever 28 and the angle lever 35 form a sort of quadrilateral bellcrank.

Upon focusing of the lens 25 the focus setting lever 28 is now for instance moved downwards — related to FIG. 2 —, whereby this lever 28 is turned round the axis 29. Due to the oblique slot 33, the arm 34 of the angle lever 35 is moved to the right, the arm abutting the oblique surface 36 is moved downwards. That way the portion 26 bearing the segment 24 is turned to the right — related to FIG. 2 — and shifts the lens 25 by means of the toothed rack 23.

A setting lever for frame frequency 40, which is provided directly near the focus setting lever 28, is during normal projection in the dash-lined position 40'. At standstill projection, the lever 40 is pressed downwards — related to FIG. 2 —, whereby a stop 39 of the lever 40 abuts the other end of the two-armed lever 31. In order to enable the now required adjusting focusing of the lens for sharper reproduction, the lever 40 is further pressed downwards. By the stop 39 the two-armed lever 31 is turned, which again transmits the movement over the end, which is flexibly connected with the extension 27 to the portion 26 bearing the toothed segment 24. Again related to FIG. 2, the portion 26 moves against the action of a spring 38 to the left and adjusts the lens by the desired amount. Upon release of the focusing lever 28, it reaches again the mark zero by the force of the spring 38. The original focus setting has not been changed, because the position of the pin 32 in the oblique slot 33 remained unaltered.

Theoretically it would be possible to design the arrangement in such a manner that the lens could be shifted in both directions. Since however in a projector the position of the emulsion layer of the film with respect to the position of the projection lamp remains always the same, the film will bend at standstill projection always in the same direction. Therefore an adjusting focusing of the lens its only necessary in one direction.

Preferably the lever for adjusting focusing itself is designed as mode control switch or at least it is directly connected with the same. A groove provided in the guide of the lever could then correspond with the position for projection with another frame frequency (for instance 9 frames per sec.). With this lever a cam follower or a cam could then at the same time be controlled for the meshing stroke of the claw.

Further possibilities of design for the focus setting lever 28 illustrated in FIG. 2 are displayed in FIGS. 3 to 6.

Figure 3:
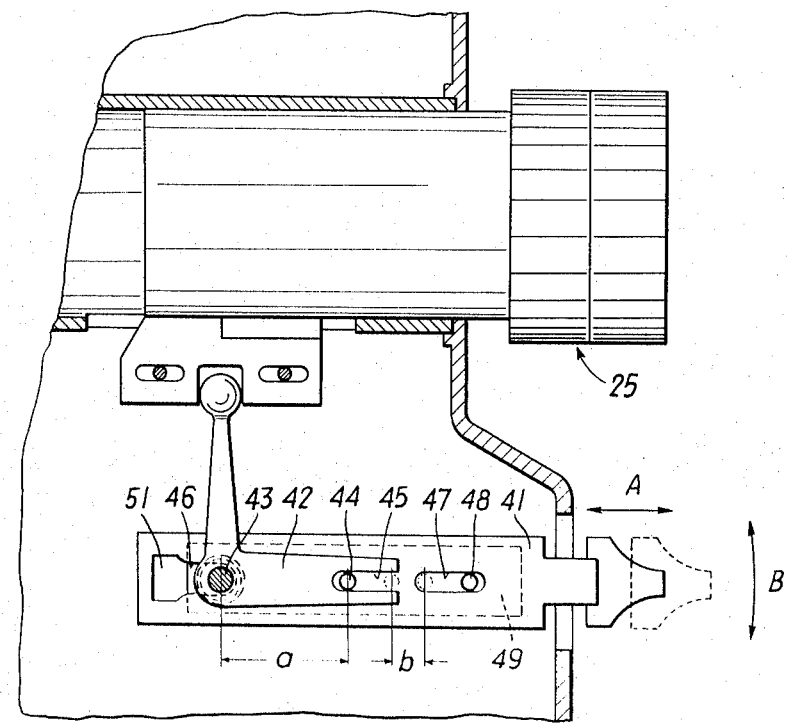

In FIG. 3 a lever corresponding to the focus setting lever 28 is marked with the reference numeral 41. This lever 41 is pivotally arranged round a fixed axis 43 together with an angle 42, whereby the connection between the angle 42 and the focusing lever is carried out over a pin 44 of the lever 41. The pin 44 is situated in a slot guide 45 of the angle 42, which angle equals in its function the portion 26 illustrated in FIG. 2, that is for adjusting the lens 25.

Besides the pin 44 the focusing lever 41 shows two slot guides 46, 47, in the first of which there is arranged the axis 43 and a pin 48 of a friction lever 49, which is likewise tiltable round the axis 43, is assigned to the guide 47. Generally considered the focusing lever is shiftable along the slot guides 46, 47 in the direction of the arrow A and tiltable round the axis 43 in the direction of the arrow B.

If the focusing lever 41 is in the position in which the axis 43 is situated at the right end of the slot 46 — related to FIG. 3 —, a deviation of the lever 41 in the direction B causes an adjustment of the lens 25, in that the angle 42 controlling the lens 25 over a ball guide is deviated by the lever 41 over the pin 44. The transmission with which the lens is adjusted relatively to the deviating angle of the lever 41 depends on the distance "9" between the axis 43 and the pin 44. Upon deviation also the friction lever 49, which meshes with the slot 47 of the focus setting lever 41 over the pin 48, is taken along. A bearing 50 of the lever 49 on the axis 43 (see FIG. 3A) causes by its highly set bearing friction a heavy previous focusing of the lens.

If the lever 41 is pulled to the right — related to FIG. 3 —, the axis 43 arrives in a widening 51 of the slot 46. At the same time the pins 44 and 48 occupy the dash-lined position of FIG. 3, in which they are removed from each other in a distance "b." Upon turning of the lever 41, the centre of gravity is no more the axis 43 situated in the widening 51, but the pin 48 of the friction lever 49. The reason why this is possible is, as already set forth, that the bearing 50 fits with heavy friction to the axis 43, so that upon deviation of the lever 41 the friction lever 49 remains in its position. The focusing of the lens 25 is effected over the pin 44 of the focusing lever 41 and the angle 42. As the now working lever arm "b" is much smaller than the previously working arm "a", also a fine setting of the lens becomes possible.

Figure 3A:
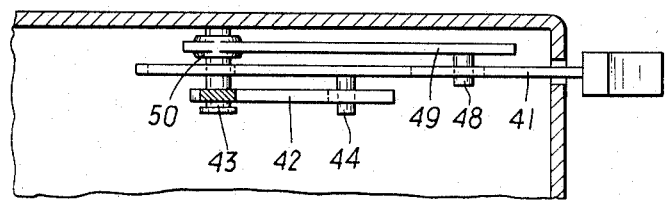
Figure 4:
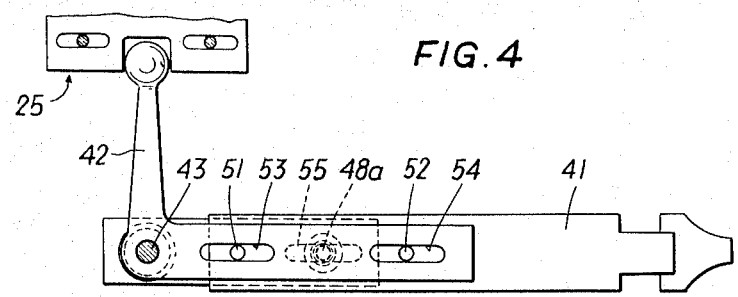
Figure 4A:
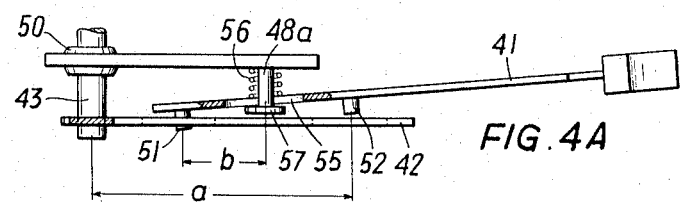

A variation slightly differing from the construction of FIGS. 3, 3A is illustrated in FIGS. 4, 4A, whereby parts of the same function are marked with the same reference numerals.

The focusing lever 41 is not tiltable round the axis 43, but bears pins 51 and 52. The pin 51 is assigned to a slot 53, the pin 52 to a slot 54 of the angle 42. Between the two pins the focusing lever 41 shows a longhole 55 (see FIG. 4A), which supports an axis 48a of the friction lever 49. A pressure spring 56 on the axis 48a secures the friction lever 51 against a collar 57 of the axis 48a.

The focusing lever 41 tiltable round the axis 48a in the direction of the arrow B is further tiltable along the axis 48a in the direction of the arrow C against the action of the spring 56 (see FIG. 4A). Upon this deviation in the direction C only the pin 51 meshes with the slot 53 of the angle 42, whereas in the rest position also the pin 52 engages the slot 54.

If now the focusing lever 41 is tuened in the position in which also the pin 52 engages the slot 54 in the direction of the arrow B, the friction lever 49 as well as angle 42 are taken along, whereby again the friction in the bearing 50 causes a relatively heavy displacement of the lens 25. In that way it is secured that the focusing lever 41 does not cause a displacement of the lens by its own weight. In this coarse setting the operative lever length is again marked by "a."

If the focusing lever 41 is turned in the direction of the arrow C against the action of the spring 56, the pin 52 disengages the slot 54. A focusing in this position causes a turning of the lever 41 round the axis 48a of the friction lever 49 kept in friction. Herewith the pin 51 of the lever 41 arranged in a distance "b" from the axis 48a transmits the movement to the angle 42 and consequently to the lens 25. since, as in the embodiment shown in FIG. 3, the lever length "b" is much smaller than the length "a," again a fine setting of the lens 25 becomes possible in the last described position of the focusing lever 41.

Figure 5:
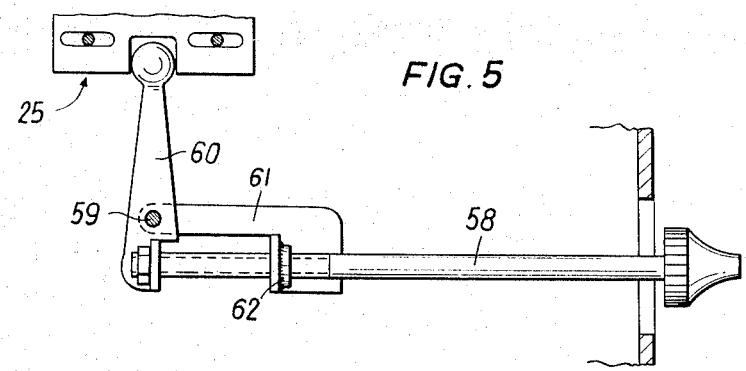

FIG. 5 displays a much simplified form of an arrangement for coarse and fine setting of the lens. Instead of the focusing lever 41 a focusing spindle 58 is provided in this construction, on the end of which there is fastened a transmission lever, which is tiltable round a fixed axis 59. The transmission lever 60 is as usual coupled with the lens carrier, for instance over a ball seat. Further an angle 61 is tiltable round the axis 59, which angle shows a tab 62 provided with a threaded sleeve, in which the focusing spindle is guided.

For the coarse setting of the lens 25, the spindle 58 is turned in the direction of the arrow B, whereby the angle 61 situated in a friction bearing on the axis 59, turns round the axis 59 and likewise causes a deviation of the transmission lever 60 round the axis 59. In that way the lens is preadjusted.

For fine setting one turns the focusing spindle, whereby the transmission lever 60 is removed from or guided to the threaded tab 62, depending on the position of the same. The turning of the transmission lever 60 occurs in a much smaller angle range as at coarse setting, so that smaller adjusting ways are transmitted on the lens.

Figure 6:
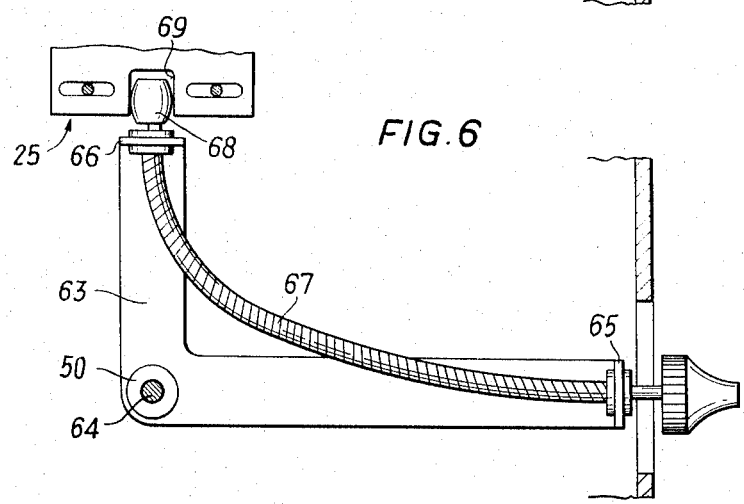

Finally FIG. 6 shows a further simple embodiment, whereby an angle 63 twistable on a fixed axis 64 is provided for coarse setting of the lens 25. The angle 63 bears a tab 65 or 66 respectively, on each end, in which there is guided a flexible shaft 67. For the transmission of the deviating movement of the angle 63, respectively of the rotating movement of the shaft 67, a roller 68 is shiftably and pivotally arranged in a slot guide 69 in the lens casing.

For the coarse setting of the lens the angle 63 is deviated round the axis 64, whereby the shaft 67 is guided at the angle 63 and meshes with the roller and thus transmits the movement. For fine setting the shaft is turned, whereby the excentric coupling of the shaft 67 to the roller 68 causes the fine setting. The angle 63 is during this operation again held by the friction bearing 50.

What is claimed is:

1. In a motion film projector an image plane;
   gate means for holding a frame of a motion picture film to be projected in said image plane;
   an optical system defining an optical axis, said frame being located on said optical axis;
   focusing means for said optical system;
   drive means for feeding said film along a predetermined path including said image plane, said drive means having at least two operating modes comprising at least one run mode and a still mode of operation for selectively providing motion picture projection and still picture projection;
   focus adjusting means connected to said focusing means to provide a basic adjustment of the same for focusing the frames of said film during the run mode operation;
   mode selecting means controlling the operating modes of said drive means and having accordingly at least one run mode position and a still mode position; coupling means to connect said focusing means to said mode selecting means;
   said mode selecting means further having a plurality of focusing positions adjacent said still mode position, in said focusing positions said coupling means connecting said focusing means to said mode selecting means to override said basic adjustment and to focus said frame individually during the still mode operation.

2. A motion film projector as claimed in claim 1, wherein said mode selecting means are manually operable.

3. A motion film projector as claimed in claim 1, wherein said mode selecting means are continuously movable through said focusing positions.

4. A motion film projector as claimed in claim 1 further comprising biasing means connected to said mode selecting means, to urge the same out of said focusing positions towards said still mode position.

5. A motion film projector as claimed in claim 1 further comprising a heat insulating member connected to said mode selecting means, in the run mode position of said mode selecting means said heat insulating member being out of the range of said optical axis, in said still mode position and said focusing positions said heat insulating member being moved onto said optical axis.

6. A motion film projector as claimed in claim 1 further comprising spring means connected to said focusing means and urging the latter towards said basic adjustment.

7. A motion film projector as claimed in claim 4, which includes,
   biasing means connected to said focusing means, and wherein said spring means and said biasing means are identical.

8. A motion film projector as claimed in claim 1, wherein said mode selecting means include two extreme mode positions, at least one of which corresponds to the still mode operation of said drive means.

* * * * *